(12) United States Patent
Pozsgay et al.

(10) Patent No.: US 6,479,968 B1
(45) Date of Patent: Nov. 12, 2002

(54) METHOD OF CHARGING A BATTERY UTILIZING DYNAMIC CABLE COMPENSATION

(75) Inventors: Brian Thomas Pozsgay, Lilburn; Martin Hague Ramsden, Lawrenceville; Taneka Frazier, Duluth, all of GA (US); Ang Teik Heng, Victoria (AU)

(73) Assignee: Motorola, Inc., Schaumburg, IL (US)

( * ) Notice: Subject to any disclaimer, the term of this patent is extended or adjusted under 35 U.S.C. 154(b) by 78 days.

(21) Appl. No.: 09/672,125

(22) Filed: Sep. 27, 2000

(51) Int. Cl.⁷ .......................... H02J 7/14; G01N 27/416
(52) U.S. Cl. ....................... 320/137; 324/430
(58) Field of Search ............................ 320/137; 324/430

(56) References Cited

U.S. PATENT DOCUMENTS

| | | |
|---|---|---|
| 5,254,951 A | 10/1993 | Goto et al. |
| 5,365,180 A | 11/1994 | Edelman |
| 5,386,188 A | 1/1995 | Minneman et al. |
| 5,546,010 A | 8/1996 | Verhaart |
| 5,600,255 A | 2/1997 | Moore et al. |
| 5,721,688 A | 2/1998 | Bramwell |
| 5,969,508 A | * 10/1999 | Patino et al. ............ 320/144 |
| 6,023,150 A | * 2/2000 | Patino et al. ............ 320/132 |

* cited by examiner

Primary Examiner—Gregory Toatley
(74) Attorney, Agent, or Firm—Philip H. Burrus, IV

(57) ABSTRACT

This invention includes a method for sensing the parasitic impedance in a battery charging system and compensating for these parasitic impedances. In one embodiment, the voltage of the system is measured with no charging current applied. Next, a charging current is applied and a second voltage is measured. The parasitic impedance is then extrapolated and multiplied by a predetermined rapid charging current. The product is added to a predetermined cell termination voltage. The charging means remains in a rapid charge current mode until a voltage equal to the sum of the impedance-current product and the predetermined voltage is reached, wherein the current is reduced to a maintenance charging level.

3 Claims, 3 Drawing Sheets

METHOD OF CHARGING A BATTERY UTILIZING DYNAMIC CABLE COMPENSATION

TECHNICAL FIELD

This invention relates generally to battery charging methods, and more particularly to charging battery cells while dynamically compensating for parasitic cable impedance.

BACKGROUND

Rechargeable battery cells are typically charged with chargers and power supplies that connect to a host device through a copper cable. For example, in a cellular telephone application, a power supply might plug into a wall receptacle, with a three to six foot cable running from the supply to the phone. These cables, like any metal conductor, have a parasitic impedance. They are not perfect conductors in that when current passes through the cable, power is dissipated due to the characteristic resistivity ($\rho$) of the conductor. This dissipated power is lost as heat, which reduces the efficiency of the charging system.

The parasitic power loss is problematic to charger designers. Lithium batteries have very sensitive voltage thresholds that cannot be exceeded. For example, the integrity of a lithium cell rated at 4.1 V can be compromised if charged to a voltage above this limit. At the same time, the voltage of a lithium battery is a direct indicator of battery capacity. Thus, the goal is to charge the battery as quickly as possible to 4.1 V, without exceeding this limit.

Chargers that employ a cable to connect to the battery must measure the termination voltage of the battery at the charger side of the cable. As a result, the actual voltage measured by the charger is the battery cell voltage plus the voltage drop across the cable. As the cable impedance can be as high as 600 m$\Omega$, and as the charging current can be as high as 1 amp, the actual measured voltage at the charger can be in error by as much as 600 mV! Additionally, the impedance of the cable can vary with the quality of the connection and temperature of the conductor.

One possible solution to this erroneous measurement is to take the voltage measurement on the battery side of the cable. The problem with this method is that an extra conductor in the cable is required to transmit the voltage information back to the charger. This adds cost and weight to the charging system.

Chargers generally charge initially at a very high current (rapid charge) until the cell reaches its termination voltage, and then at a very low rate (trickle charge) until the battery is fully charged. The longer that a charger remains in rapid charging mode, the quicker the battery will charge. Erroneous voltage measurements mean that the charger will begin to taper charging current before charging is complete. In other words, the charger will sense 4.1 V (and therefore terminate rapid charging) before the cell actually hits 4.1V because there will be a 600 mV parasitic voltage drop across the cable. Since the charger does not know what the impedance of the cable is, it must assume a zero impedance and thus terminate rapid charging when the charger side of the cable reaches 4.1 V. The net effect is that a battery takes longer to charge than it should.

The charger's goal is to accurately and quickly charge the cell. Parasitic cable impedance interferes with this goal. There is thus a need for a faster charging algorithm which compensates for cable impedance.

DETAILED DESCRIPTION OF THE INVENTION

Figure 1:
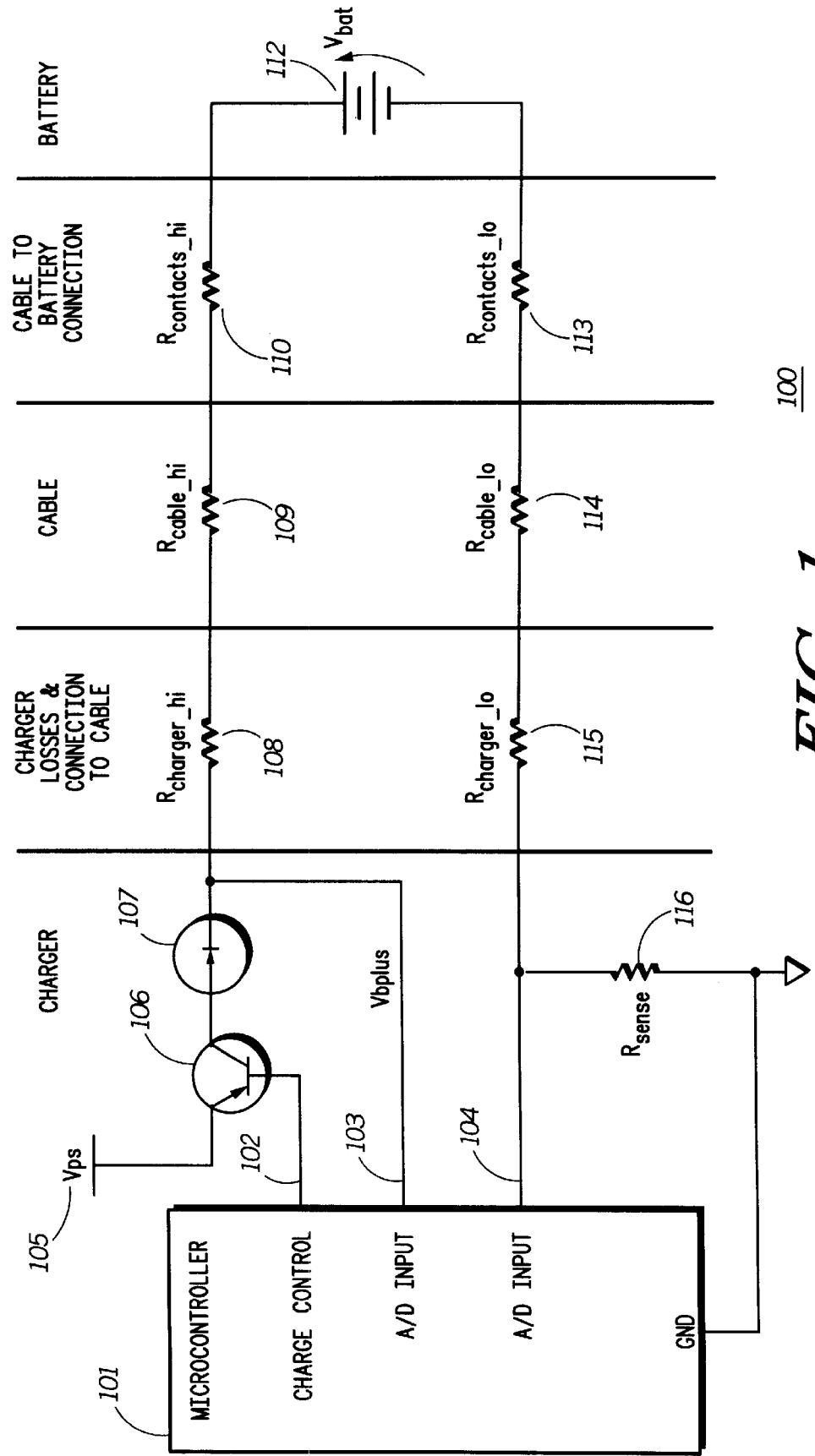
FIG. 1 is a schematic diagram of an exemplary charging circuit applicable to the present invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention includes a battery charging algorithm and method for compensating for the parasitic impedance of a cable. This invention can be employed on conventional charging hardware by integrating the steps of the algorithm into the charger's operating firmware.

Referring now to FIG. 1, a typical charging circuit 100, with parasitic impedances 108–110, 113–115, is illustrated therein. The charging circuit includes a control circuit 101, which may be a microprocessor, programmable logic, state machine, pulse width modulator controller, or the like. For exemplary purposes, we will describe the control circuit 101 as a microprocessor, as microprocessors are very flexible with respect to configuration. Any number of microprocessors could be used in this application, including the 78 KOS family manufactured by NEC.

The control circuit 101 includes a charge control output 102. This charge control output 102 can be a binary hi-lo output for controlling a pass transistor 106 in an on-off state, a pulse width modulated switching output, or a linear output to control a linear regulator. A pass transistor 106 serves as the voltage converter and a blocking diode 107 ensures that the charging circuit 100 does not discharge the battery cell 112. Also included is a current sense resistor 116 so that the control circuit 101 may monitor the charging current through the second analog to digital (A/D) converter 104. A first A/D converter 103 senses the voltage at the charger by comparing the first A/D converter 103 value and the second A/D converter 104 value.

Various parasitic impedances are also shown. These impedances include the first contact impedances 108,115 where the cable connects to the charger, the cable impedances 109,114 and the second contact impedances 110,113 where the cable connects to the battery. By way of Kirchoff's Voltage Law, as current flows from the blocking diode 107 to the current sense resistor 116, there are six parasitic voltage drops across the parasitic impedances and the voltage drop across the cell. The voltage measured by the control circuit 101 includes these six parasitic drops and is thus not-equal to the cell voltage while current is flowing through the cable.

One embodiment of this invention determines the equivalent circuit impedance by applying predetermined charging currents, measuring the voltage with the control circuit 101 and then mathematically extrapolating the equivalent resistance. Once this resistance is known, the charger may apply a rapid charging current until the voltage sensed by the control circuit 101 is equal to the termination voltage of the cell 112 plus the charging current times the equivalent resistance, thereby reducing the charging time of the cell 112.

By way of example, a first charging current of 100 mA may be applied to the cell 112, and a corresponding voltage V1 would be determined by subtracting the voltage at the second A/D 104 from the voltage at the first A/D. Next, a 500 mA current may be applied and a second voltage, V2, could likewise be measured. From Ohm's Law, it is known that:

$$V_{chgr} = V_{cell} + I_{chg} * R_{equiv}$$

where $V_{chgr}$ is either V1 or V2, $V_{cell}$ is the voltage of the cell 112, $I_{chg}$ is the applied charging current and $R_{equiv}$ is the equivalent resistance.

When the first charging current and second charging current are applied across a short period of time, the battery cell voltage remains effectively constant. Thus, the equivalent impedance, Requiv, can be determined by having the control circuit 101 simultaneously solve two equations by substituting V1 and V2 for Vchgr and the corresponding currents for Ichg. The corresponding firmware algorithm for the control circuit 101 might look as follows:

Set $V1 = Vcell + 100\ mA * Requiv$

Set $V2 = Vcell + 500\ mA * Requiv$

Set $Requiv = (V2 - V1)/(500 - 100)$

If the cell voltage can be reliably measured with the current off, the calculation of Requiv can be further simplified. There would only need to be one charging current. The equation would simply be:

$$Requiv = (V2 - V1)Ichg$$

Once the equivalent resistance is known, the control circuit 101 can be programmed to charge in rapid mode until the charger voltage reaches the cell termination voltage plus the rapid charge current times the equivalent resistance. This method of charging greatly reduces the charging time of a cell.

Figure 2:
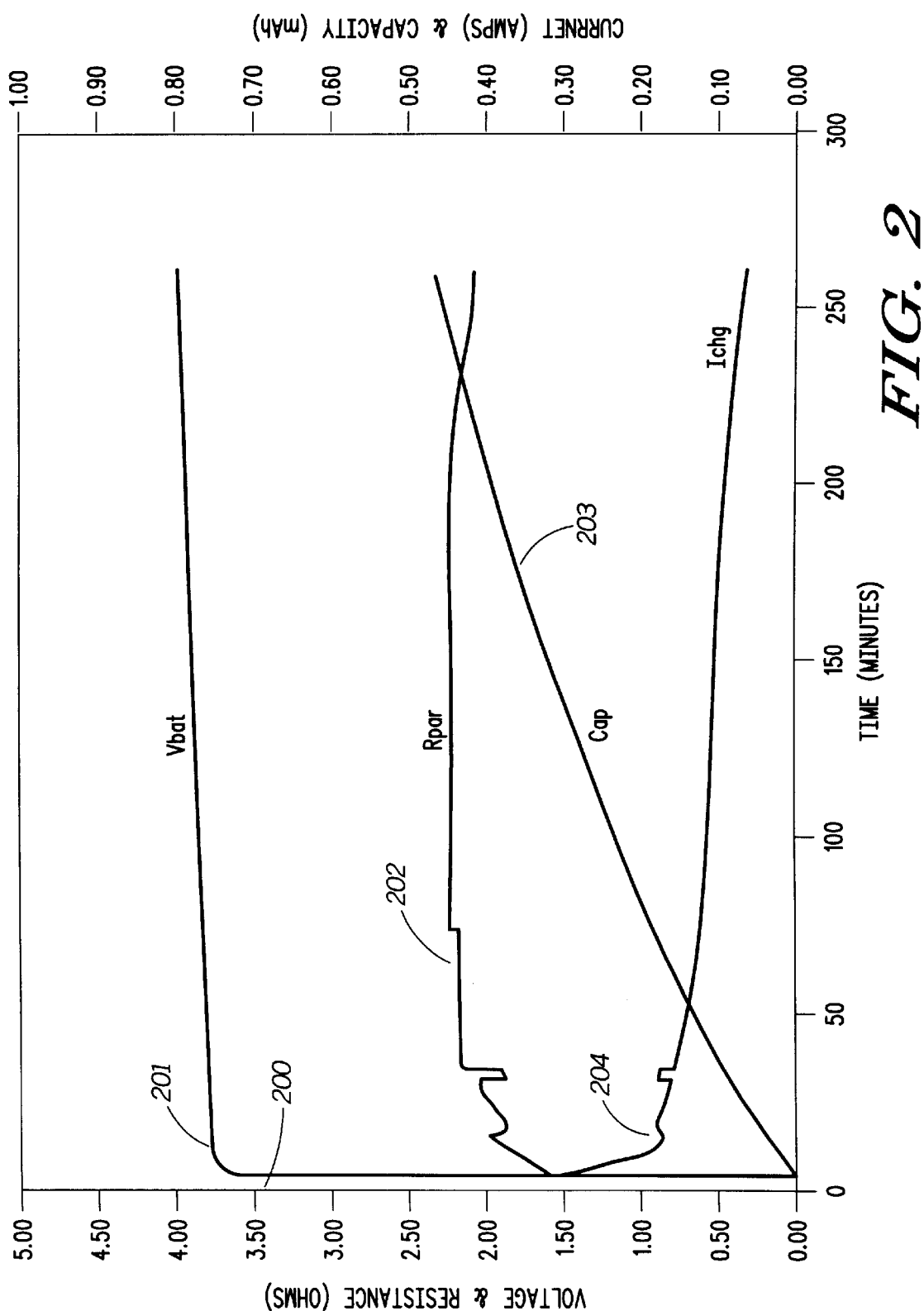
FIG. 2 illustrates graphical data of battery charging without compensation for parasitic impedance.

As previously noted, when the equivalent resistance is not compensated for, the charger prematurely reduces the charging current from a rapid charge to a trickle charge. Referring now to FIG. 2, illustrated therein is a charging curve for a 650 mA*h, 4.1 V lithium-ion cell where no cable compensation is taken into account. As can be seen at point 200, a rapid charge current is applied until the cell voltage reaches 90% of its termination value (4.1V) at point 201. This voltage includes not only the cell voltage, but also the equivalent resistance (represented by curve 202) times the charging current.

Battery capacity was measured by an external device and is plotted on the same graph as curve 203. Once 90% of the termination voltage is reached at point 201, the charging current is reduced to a trickle current at point 204. By charging in this mode, after 250 minutes, the cell has reached 460 mA*h, or 70% of its rated capacity.

Figure 3:
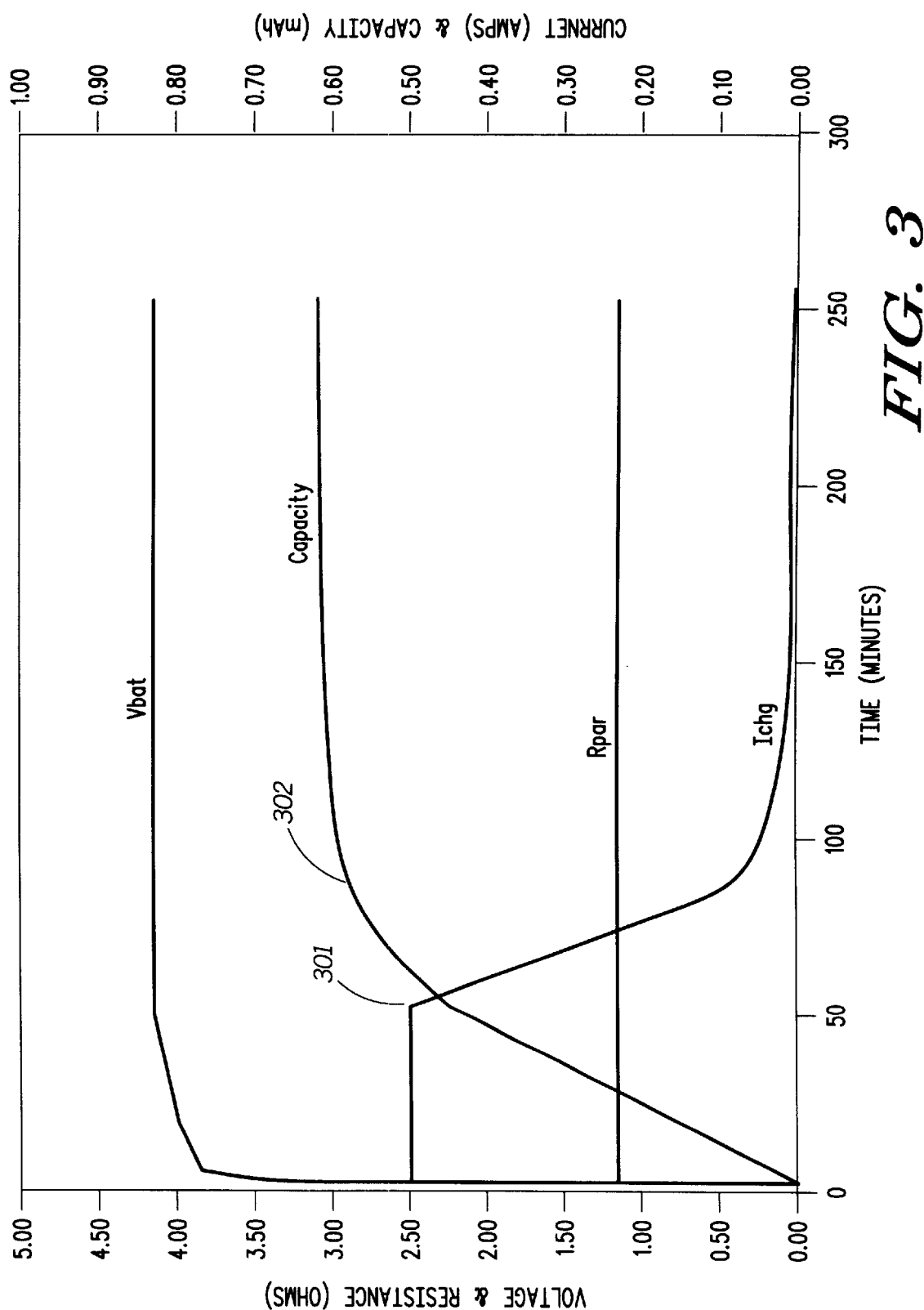
FIG. 3 illustrates graphical data of battery charging in accordance with the present invention.

Referring now to FIG. 3, illustrated therein is a graph showing the same parameters as in FIG. 2, but with cable compensation. While the battery was charging, a 500 mA test current was applied and a voltage was measured and stored by the control circuit as V1. The current was then turned off and a second voltage was stored by the control circuit as V2. Using the method above, the equivalent impedance was calculated as 1.2 Ohms. Thus, the termination voltage (the voltage at which rapid charge is changed to trickle charge) was increased from 4.1V (the termination voltage of the cell) to 7.1V (4.1V+1.2 Ohms*2.5 A).

As can be seen from the graph, the rapid charging current is applied for nearly 50 minutes, as opposed to the less than 5 minutes of FIG. 2. Consequently, the battery reaches 90% of its capacity in only 60 minutes, as opposed to more than 250 minutes in FIG. 2. Thus, the method yields more than a 400% improvement in charging time.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while the invention has been described as using a microprocessor capable of mathematical computation, the circuit could easily be designed with analog parts using comparators to reach thresholds in the detection of the equivalent impedance.

What is claimed is:

1. A method for charging a battery, the method comprising the steps of:
   a. providing a system for charging, wherein the system comprises
      i. a means for charging; and
      ii. at least one rechargeable battery cell;
   b. determining a parasitic impedance of the system for charging; and
   c. compensating for the parasitic impedance while charging the at least one rechargeable battery cell;
   wherein the determining a parasitic impedance comprises the steps of;
      a. applying a first charging current and sensing a first voltage;
      b. applying a second charging current and sensing a second voltage; and
      c. extrapolating the parasitic impedance.

2. The method of claim 1, wherein the compensating for the parasitic impedance comprises the steps of:
   a. determining a product of the charging current and the parasitic impedance;
   b. determining a sum of the product of the charging current and the parasitic impedance and a predetermined termination voltage; and
   c. reducing charging current when the sum of the product of the charging current and the parasitic impedance and a predetermined termination voltage is reached.

3. A method for charging a battery, the method comprising the steps of:
   a. providing a system for charging, wherein the system comprises
      i. a means for charging; and
      ii. at least one rechargeable battery cell;
   b. determining a parasitic impedance of the system for charging; and
   c. compensating for the parasitic impedance while charging the at least one rechargeable battery cell;
   wherein the determining a parasitic comprises the steps of:
      a. sensing a first voltage when no charging current is being applied;
      b. applying a first charging current and sensing a second voltage; and
      c. calculating the parasitic impedance.

* * * * *